July 9, 1946.                G. HOHWART ET AL                2,403,599
                                DIAPHRAGM CHUCK
                            Filed Nov. 11, 1944           2 Sheets-Sheet 2

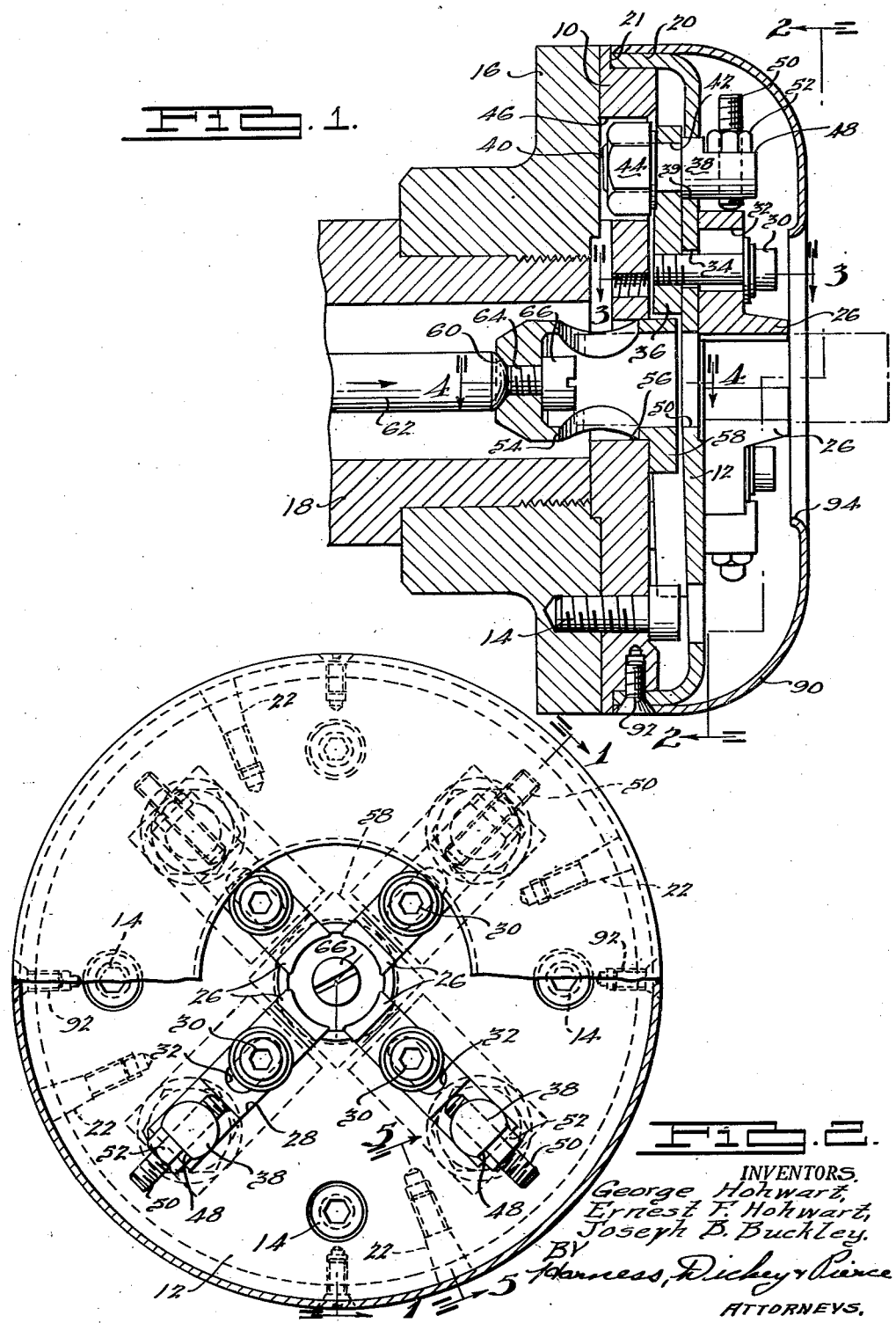

INVENTORS.
George Hohwart,
Ernest F. Hohwart,
Joseph B. Buckley.
BY
Harness, Dickey & Pierce.
ATTORNEYS.

Patented July 9, 1946

2,403,599

UNITED STATES PATENT OFFICE 2,403,599

DIAPHRAGM CHUCK

George Hohwart, Orchard Lake, Ernest F. Hohwart, Detroit, and Joseph B. Buckley, Ferndale, Mich., assignors to N. A. Woodworth Company, Ferndale, Mich., a corporation of Michigan Application November 11, 1944, Serial No. 563,056

9 Claims. (Cl. 279—46)

This invention relates to diaphragm chucks and has for its principal object the provision of a chuck of this type having improved characteristics.

Objects of the invention include the provision of a diaphragm chuck adapted to operate satisfactorily over a wide range of rotational speeds; the provision of a diaphragm chuck in which the centrifugal force acting on the chuck jaws and tending to open the chuck is neutralized or even reversed; the provision of a diaphragm chuck in which means are provided on the rear face of the diaphragm to counterbalance the weight of the chuck jaws tending to open the chuck under the effects of centrifugal force; the provision of a construction as above described in which the counterbalancing weight form functional parts of the structure; the provision of a diaphragm chuck so formed and constructed as to enable either one of two different means to be employed for limiting the amount which a workpiece may be inserted into the chuck; the provision of a diaphragm chuck having a novel means for securing the diaphragm to the chuck; and the provision of a diaphragm chuck of new and novel construction.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a sectional view taken through the axis of a diaphragm chuck, as on the line 1—1 of Fig. 2, showing the same mounted upon the end of a machine tool spindle;

Fig. 2 is a partially broken, partially sectioned face view of the chuck shown in Fig. 1, the section being taken as on the line 2—2 of Fig. 1;

Figure 3:
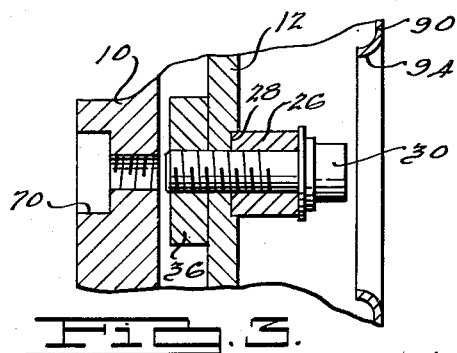
Fig. 3 is a slightly enlarged fragmentary, sectional view taken on the line 3—3 of Fig. 1 and illustrating clamping means for the chuck jaws.
Figure 4:
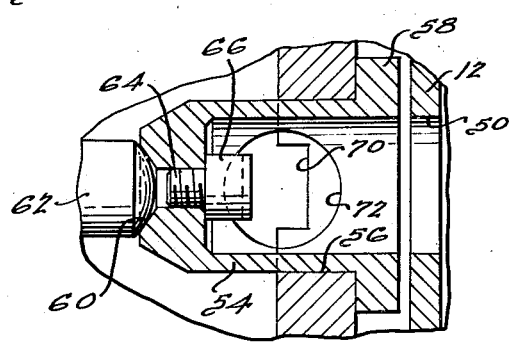
Fig. 4 is a slightly enlarged fragmentary, sectional view taken on the line 4—4 of Fig. 1 to better bring out the means for actuating the diaphragm and for limiting the depth of insertion of the work therein.

As is commonly understood, diaphragm chucks consist essentially in a disc or diaphragm of metal upon the outer face of which work receiving jaws are either removably or permanently fixed, and means are provided for distorting or springing the central portion of the diaphragm axially with respect to the peripheral edges thereof whereby to cause a slight separation of the jaws in order to permit the insertion of work therein, upon which insertion the distorting or springing force is released to permit the diaphragm to contract the jaws upon the work. The work, in being engaged by the jaws, prevents a complete return of the diaphragm to its original free condition, thereby to maintain a clamping force on the work in the jaws for the purpose of permitting a machining operation to be performed on the work.

In the past such diaphragm chucks have been designed to operate through a relatively limited range of speeds. That is, each chuck has been designed to operate at a limited range of speed and if run at a materially higher rate of rotation than that for which it has been designed the centrifugal force set up by the rotating jaws on the outer face of the diaphragm often becomes great enough to offset the stress of the diaphragm tending to hold the jaws clamped upon the work, with the result that the work either slips in the jaws or becomes disengaged from the chuck.

It is, therefore, the principal object of the present invention to so form a diaphragm chuck as to eliminate the before described condition and so that a single chuck may be operated at any conventional speed without danger of the work loosening up in it. This is accomplished by so forming the chuck that a body of metal is provided on the rear face of the diaphragm of such mass and disposition as to apply to the diaphragm substantially the same, or greater, stress from the centrifugal force acting on it during rotation, as the mass of metal on the forward side of the diaphragm, and the bulk of which mass on the forward side is ordinarily represented by the chuck jaws. At the same time the body of metal thus provided for counterbalancing the centrifugal effect of the jaws is utilized to provide additional functions so that it does not merely represent dead weight unnecessarily building up the weight of the chuck itself. The chuck includes further novel features enhancing its simplicity and ease of manufacture which will hereinafter be described with greater detail.

Referring now to the accompanying drawings and particularly to Figs. 1 and 2 it will be noted that the chuck includes an approximately flat backing, mounting or supporting plate 10 of such thickness as to render it inflexible to all intents and purposes, and a diaphragm, which is indicated generally at 12, is carried by the plate 10 together with the remaining parts of the chuck structure. The supporting plate 10 and, therefore, the chuck per se may be secured to the spindle of a machine tool in any suitable or conventional manner. As a matter of illustration it is shown as being secured by screws 14 to a so-called mounting flange 16 which in turn is piloted on and threadably locked upon the forward end of a hollow machine tool spindle 18 in a conventional manner. The rear face of the plate 10 and the forward face of the flange 16 are provided with concentric and complementary slightly stepped surfaces in order to locate them in concentric relation with respect to each other in accordance with conventional practice.

Figure 5:
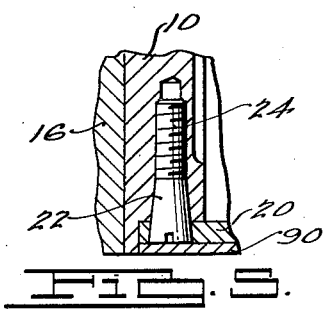
Fig. 5 is an enlarged fragmentary, sectional view taken on the line 5—5 of Fig. 2 to better illustrate the means employed for securing the diaphragm to its mounting or supporting plate.

The main body portion of the diaphragm 12 is of disc-like character, preferably of slightly greater thickness at its center than at its periphery as shown, and its peripheral margin is flanged rearwardly as at 20 and closely fits over the stepped peripheral edge of the mounting plate 10 with the body of the diaphragm in forwardly spaced relation to the plate 10 as shown. The flange 20 abuts the radial wall 21 of the stepped periphery of the plate 10 so as to aid in properly aligning these two parts. The diaphragm is held in position on the plate 10 by means of a plurality of taper pins 22 which project radially through the flange 20 of the diaphragm and into the plate 10. As best brought out in Fig. 5 the inner ends of the pins 22 are cylindrical and threaded as at 24 so that the pins 22 may be drawn tightly down into position thereby to hold the rim 20 of the diaphragm immovable with respect to the mounting plate 10.

Secured to the outer face of the diaphragm 12 are a plurality, shown as four, equally angularly spaced chuck jaws 26. As brought out in Fig. 3 the outer face of the diaphragm 12 is provided with a shallow radial groove 28 for relatively close but slidable reception of the axially inner margin of each chuck jaw 26 so as to guide it in its adjusting movement and to maintain it in proper radial relation when clamped in position to the diaphragm. Each chuck jaw 26 is clamped to the diaphragm 12 by means of a headed bolt 30 which projects in axially parallel relation with respect to the axis of the chuck through a radial slot 32 provided in the corresponding chuck jaw 26. Each bolt 30 projects through a corresponding opening 34 provided in the diaphragm 12 and its axially inner end is threaded into a nut member 36 positioned on the axially inner or rear face of the diaphragm 12.

The jaws 26 must be securely clamped in carefully radially adjusted position in order to properly hold a piece of work between them and to aid in this respect the following features are provided. An abutment in the form of a stepped cylindrical member is provided in radially outwardly spaced and aligned relation with respect to each chuck jaw 26. Each such abutment comprises a head portion 38 which is closely received in a complementary opening 39 in the diaphragm 12, and a projecting stud portion 40, extending in parallel relation with respect to the axis of rotation of the chuck. The stud portion 40 is of slightly smaller diameter than the head portion 38 and is relatively closely received in an opening 42 provided in the corresponding nut member 36 which is extended radially outwardly to a distance sufficient for this purpose. A nut 44 threaded on the rear end of the stud portion 40 draws the shoulder formed between the stud portion 40 and the head 38 against the forward face of the corresponding nut member 36 and serves to securely clamp it to the nut member. As will be observed from an inspection of Fig. 1 the mounting plate 10 is cut away as at 46 for reception of each of the stud portions 40 and their corresponding nuts 44, thereby permitting the overall length of the chuck to be correspondingly reduced.

The axially outer end of each head 38 is flattened off as at 48 on a plane tangent to a circle concentric with the axis of the chuck and threaded radially down through the flattened off portion is an adjusting and abutment screw 50, the radially inner end of which is extended into abutting relationship with respect to the radially outer end of the corresponding chuck jaw 26. A lock nut 52 is provided for locking each screw 50 in its adjusted position. In view of the fact that the head 38 of each abutment member is closely received in the corresponding opening 39 in the diaphragm 12, it will be appreciated that the reaction to the force of the screw acting on the corresponding chuck jaw 26 is transmitted directly to the diaphragm 12 and the reception of the stud portion 40 of each of the abutment members in the corresponding nut 36 aids in maintaining the rigidity and position of the abutment member.

As previously described, in conventional diaphragm chuck structures the weight of the jaws, corresponding to the jaws 26, and any such means as may be provided for backing up the adjustment of the jaws on the face of the diaphragm, have been such that on occasions at least where the chuck is rotated at a speed greater than that for which it is designed the centrifugal force acting on the jaws and the backing up means tends to offset, and actually does offset in some instances, the stress existing in the diaphragm 12 tending to hold a piece of work within the chuck jaws, with the result that the chuck jaws open up and allow the work to become disengaged. In the present case the nuts 36 in being of relatively great radial length and being positioned on the rear face of the diaphragm, and the stud portions 40 of the abutments projecting a material distance rearwardly of the rear face of the diaphragm and being provided with relatively heavy nuts thereon, serve as a means for counterbalancing the centrifugal effects of the chuck jaws and the adjustment means forwardly of the diaphragm. In practice the nuts 36, nut portions 40 and nuts 44 are made of such size and are so positioned as to counterbalance the centrifugal force of all of the parts projecting forwardly of the forward face of the diaphragm 12 and mounted thereon, and in some instances are made of even greater weight or effect so that increased speed of rotation will cause such excess weight to augment the stress set up in the diaphragm tending to hold a piece of work within the chuck jaws 26. As a result of this feature chucks constructed in accordance with the present invention may be run at any reasonable speed without danger of the gripping effect of the jaws 26 on the work being reduced to any material extent.

The diaphragm 12 is provided with a central hole 50 through which work gripped by the jaws 26 may project during a machining operation. The clamping face of the jaws 26 will ordinarily project radially inwardly beyond the margins of the holes 50 and this is necessarily so in all cases except where the piece of work is of less axial length than the axial length of the jaws 26.

As in the case of all diaphragm type chucks, the jaws 26 are expanded to receive a piece of work by applying pressure to the diaphragm adjacent its axis and in an axially outward direction to spring or distort the central portion of the diaphragm axially outwardly with respect to its peripheral marginal portion. In the present case in order to effect such distortion the following mechanism is provided. A cup-shaped member 54 of generally circular section is projected through a central opening 56 in the mounting plate 10 and is relatively closely but slidably received therein. The free end of the member 54 is provided with a radially outwardly projecting flange 58 which, as best brought out in Fig. 2, is square so as to enable it to fit between the inner ends of the nuts 36. The flange 58 overlies the axially outer face of the mounting plate 10 around the margins of the opening 56 and in being confined between the mounting plate 10 and the diaphragm 12 maintains the member 54 against inadvertent axial displacement.

The rear end of the member 54 is provided with a shallow pocket or recess 60 therein in which the forward end of a push rod 62 is received. Axial pressure may be applied to the push rod 62 in any suitable or conventional manner, such as through a hand lever, air pressure, hydraulic pressure or the like. Upon axial pressure being applied to the rod 62 to the right, as viewed in Fig. 1, such pressure is transmitted through the member 54 to the central portion of the diaphragm 12 and where such pressure is sufficient, as is required to effect operation of the chuck, the central portion of the chuck will be displaced axially outwardly with respect to its periphery and cause the operative or clamping surfaces of the jaws 26 to be radially separated from one another by an amount which is small but sufficient to permit insertion of the work therein, whereupon upon release of the pressure on the rod 62 the resiliency of the diaphragm 12 in springing back toward its free position will cause the jaws 26 to be contracted with respect to each other and about the work which has been inserted therein so as to grip such work in the jaws for a machining operation.

It is usually desirable to provide some means for limiting the amount which a piece of work may be projected into the chuck for a machining operation and while in the broader aspects of the present invention any suitable means may be provided for this purpose, in Figs. 1 to 4, inclusive, such means is shown as comprising a screw 64 having a head 66 thereon, the screw being threaded centrally into the bottom wall of the cup-shaped member 54 with the head 66 thereof projecting axially outwardly from such bottom wall. The axially outer face of the head 66 of the screw 64 serves as a stop for work projected into the jaws 26 and, therefore, acts to limit the amount which such work may be projected into the chuck. By employing screws having various lengths of heads 66 the work may be stopped at any desired point in the length of the chuck as will be readily appreciated.

Figure 6:
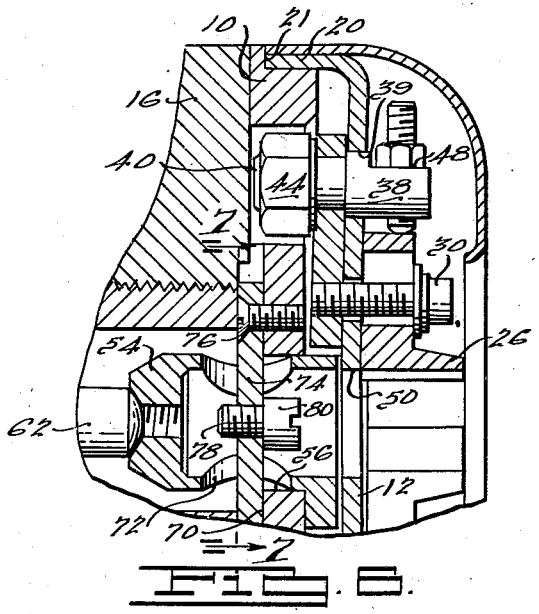
Fig. 6 is a fragmentary view taken in the same plane as Fig. 1 and illustrating means employed for limiting the depth of insertion of work in the chuck, particularly where the operation on the work is one forming it to a predetermined length; and, Fig. 7 is a fragmentary sectional view taken on the line 7—7 of Fig. 6.
Figure 7:
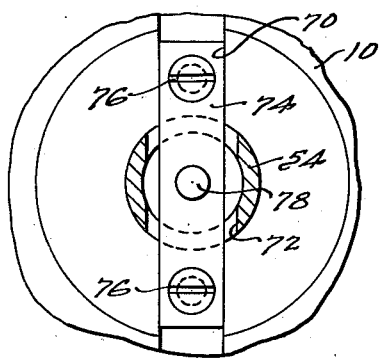

Stops of the character 64—66 just described are usually sufficient for most classes of work where, for instance, the bore of the work is being operated upon. However, where a piece of work is inserted in the chuck and its axially outer end face is to be brought into extremely accurate relation with respect to the opposite axial face of the work, that is, where the machining operation is on the axially outer face of the work and the length of the work must be accurately controlled, then a different form of stop is preferably employed. This is brought out best in Figs. 6 and 7 from which it will be observed that the rear face of the mounting plate 10 is provided with a diametrically disposed groove 70 and that the member 54 in radial alignment therewith is provided with diametrically disposed holes 72 therethrough. A bar member 74 of the same width as the groove 70 is closely received therein in bridging relation with respect to the central hole 56 of the mounting plate 10 and projects through the holes 72 in the member 54. The bar member 74 is secured in position in the groove 70 by means of screws 76. The bar member 74 is thus rigid with respect to the mounting plate 10. The bar member 74 in alignment with the axis of the chuck threadably receives therein a screw 78 having a head 80 which serves the same purpose as the head 66 of the screw 64, namely as a stop for the work received by the chuck jaws 26.

The reason that this last described construction provides a more accurate stop than the first described construction is for the reason that the member 54 may move back away from the diaphragm 12 when the expanding pressure thereon is released, and also for the reason that the amount which the diaphragm returns toward its free or clamping position upon release of the expanding pressure thereon will vary according to variations in the diameter of the work, and the member 54 will move back accordingly. Where the bar 74 is employed rigidly fixed to the mounting plate 10, then when the expanding pressure on the diaphragm is relieved after a piece of work has been inserted in the chuck jaws 26 there will be a tendency of the chuck jaws 26 to pull the work back against the stop 80 as they contract, and the position of the stop 80 will not vary regardless of the diameter of the work. Thus where the machining operation is on an axial end face of the work and the length of the work must be accurately controlled the last form of stop mechanism is preferably employed.

It is preferable to provide a guard over the axially outer face of the chuck so that protruding parts of the mechanism such as the outer ends of the screws 50, the heads of the screws 30 and the like are not exposed to catch the hands or the clothes of the operator thereon. With this in view the chuck shown is provided with a sheet metal guard member 90 of shallow cup-like construction, the open end of which fits over the flange 20 of the diaphragm 12 and is received against the shoulder 21 formed by the stepped periphery of the mounting plate 10 in the same manner as the free marginal edge of the diaphragm 20 is received on the mounting plate 10. The guard 90 is secured in position by means of screws such as 92 which extend radially inwardly through the margins of both the guard 90 and the diaphragm flange 20 and thread into the mounting plate 10. The guard 90 is provided with a central axial opening 94, the margins of which are preferably flanged inwardly as shown and which opening 94 is sufficiently large to permit insertion and withdrawal of the work into and out of the jaws 26 without unduly exposing the projecting portions of the chuck for engagement with the operator or his clothing. It will be observed that the screws 92 thus serve as means supplementary to the taper pins 22 for securing the diaphragm 12 to the mounting plate 10.

Having thus described our invention, what we claim by Letters Patent is:

1. In a diaphragm chuck, in combination, a backing member, a diaphragm secured at its peripheral marginal edge portion to said backing member, a plurality of clamping jaws mounted on the axially outer face of said diaphragm for movement radially thereof, means for clamping said jaws to said diaphragm comprising a bolt projecting through each of said jaws in parallel relation with respect to the axis of rotation of said chuck and nuts on the rear face of said diaphragm each threadably receiving one of said screws, said nuts being extended radially from their corresponding bolts, an abutment member in radially outwardly spaced relation with respect to each of said jaws, said abutment members projecting through said diaphragm and through the radially outer end of the corresponding of said nuts, screw means securing each said abutment member to said corresponding nut, and adjustable stop means carried by each said abutment member and operatively engaging the corresponding of said jaws.

2. In a diaphragm chuck, in combination, a backing member, a diaphragm secured at its peripheral marginal edge portion to said backing member, a plurality of clamping jaws mounted on the axially outer face of said diaphragm for movement radially thereof, means for clamping said jaws to said diaphragm comprising a bolt projecting through each of said jaws in parallel relation with respect to the axis of rotation of said chuck and nuts on the rear face of said diaphragm each threadably receiving one of said screws, said nuts being extended radially from their corresponding bolts, an abutment member in radially outwardly spaced relation with respect to each of said jaws, said abutment members projecting through said diaphragm and through the radially outer end of the corresponding of said nuts, screw means securing each said abutment member to said corresponding nut, adjustable stop means carried by each said abutment member and operatively engaging the corresponding of said jaws, and a shallow cup-shaped sheet metal guard member overlying said diaphragm, said abutment members and said stop screws and fixed to said backing member, said guard member having a central aperture therein for the passage of work therethrough to and from said jaws.

3. In a diaphragm chuck, in combination, a mounting member, a diaphragm arranged in generally parallel relation with respect to the forward face of said mounting plate and rigidly secured adjacent its peripheral margins thereto, said diaphragm having a plurality of radially disposed shallow grooves in its axially outer face, a chuck jaw slidably received in each of said grooves and guided for radial movement therein, each of said chuck jaws having a radially disposed slot therethrough, a screw projecting through each of said slots and through said diaphragm, nuts on the axially inner face of said diaphragm each threadably receiving one of said screws, each of said nuts extending radially outwardly from its corresponding screw, said diaphragm having an opening therethrough in radial alignment with each of said chuck jaws and radially outwardly therefrom, an abutment member received in each of said openings and including an axially outwardly projecting portion and an axially inwardly projecting portion, the axially inwardly projecting portion of each of said abutment members being closely received in the radially outer end of the corresponding of each of said nuts, a nut threadably received upon the axially inner end of each of said abutment members clamping said abutment members to the first-mentioned nuts, and a radially disposed stop screw threaded through each of said abutment members axially outwardly of said diaphragm and into abutting relationship with respect to the corresponding of said chuck jaws.

4. In a diaphragm chuck, in combination, a backing member, a diaphragm having an axially flanged marginal edge portion fitting over a peripheral surface of said backing member, and means securing said diaphragm to said backing member comprising a plurality of taper pins projecting radially through said flanged edge of said diaphragm and into said backing member and fitting each thereof, and screw means cooperating between said taper pins and said backing member for securing said taper pins against inadvertent displacement.

5. In a diaphragm chuck, in combination, a backing member, a diaphragm having an axially flanged marginal edge portion fitting over a peripheral surface of said backing member, and means securing said diaphragm to said backing member comprising a plurality of taper pins projecting radially through said flanged edge of said diaphragm and into said backing member and fitting each thereof, and a screw formed on the inner end of each said taper pins threaded into said mounting members for securing said taper pins against inadvertent displacement.

6. In a diaphragm chuck, in combination, a mounting member having a central aperture therein, a diaphragm arranged in generally spaced relation to the axially outer face of said mounting member and secured at its periphery thereto, a cup-shaped actuating member axially slidably received in said opening in said mounting member, an outwardly directed flange on the open end of said cup-shaped member disposed between said mounting member and said diaphragm, said mounting member having a radially disposed groove in the axially inner face thereof, and said cup-shaped member having openings therethrough in alignment with said groove.

7. In a diaphragm chuck, in combination, a mounting member having a central aperture therein, a diaphragm arranged in generally spaced relation to the axially outer face of said mounting member and secured at its periphery thereto, a cup-shaped actuating member axially slidably received in said opening in said mounting member, an outwardly directed flange on the open end of said cup-shaped member disposed between said mounting member and said diaphragm, said mounting member having a radially disposed groove in the axially inner face thereof, said cup-shaped member having openings therethrough in alignment with said groove, and a bar member received in said groove and projecting through said openings in said cup-shaped member.

8. In a diaphragm chuck, in combination, a mounting member having a central aperture therein, a diaphragm arranged in generally spaced relation to the axially outer face of said mounting member and secured at its periphery thereto, a cup-shaped actuating member axially slidably received in said opening in said mounting member, an outwardly directed flange on the open end of said cup-shaped member disposed between said mounting member and said diaphragm, said mounting member having a radially disposed groove in the axially inner face thereof, said cup-shaped member having openings therethrough in alignment with said groove, a bar member received in said groove and projecting through said openings in said cup-shaped member, and a stop member removably secured to said bar member within said cup-shaped member.

9. In a diaphragm chuck, in combination, a mounting member, a diaphragm arranged in generally spaced relation with respect to the forward face of said mounting member and having its peripheral margins overlying a portion thereof, a plurality of jaws secured to the axially outer face of said diaphragm, backing up means fixed to said diaphragm in radially outwardly spaced relation with respect to each said chuck jaws, a sheet metal guard overlying the outer face of said diaphragm covering said backing up means and extending into generally protecting relation with respect to said chuck jaws, and means securing said sheet metal guard to said mounting member including screw means projecting through both said guard and said diaphragm.

GEORGE HOHWART.
ERNEST F. HOHWART.
JOSEPH B. BUCKLEY.